United States Patent [19]

Bernhard

[11] Patent Number: 5,048,955
[45] Date of Patent: Sep. 17, 1991

[54] DEVICE FOR MEASURING COLOR TEMPERATURE

[75] Inventor: Jean-François Bernhard, Morrens, Switzerland

[73] Assignee: Bron Elektronik AG, Allschwil, Switzerland

[21] Appl. No.: 415,076

[22] Filed: Sep. 29, 1989

[30] Foreign Application Priority Data

Sep. 30, 1988 [DE] Fed. Rep. of Germany ....... 3833198

[51] Int. Cl.$^5$ .............................................. G01J 1/00
[52] U.S. Cl. .................................... 356/213; 356/218; 315/241 P
[58] Field of Search ............... 356/213, 219, 220, 221, 356/402, 407, 414, 416, 418, 419; 315/151, 293, 149, 241 P; 354/140, 131, 127.1, 143, 410, 132, 145.1; 250/205

[56] References Cited

U.S. PATENT DOCUMENTS 4,368,966 1/1983 Hagyuda ............................ 315/151
4,485,336 11/1984 Yoshiyama et al. ............ 315/241 P
4,853,600 8/1989 Zeltner et al. .................... 315/241 P Primary Examiner—Richard A. Rosenberger
Assistant Examiner—Hoa Pham
Attorney, Agent, or Firm—Robert W. Becker & Associates

[57] ABSTRACT

A device for measuring color temperature, having at least one measuring diffuser and at least one indicator for the color temperature, as well as operating elements for turning the device on and off, for resetting the measured values, and for initiating a measurement. To be able to easily and rapidly set or adjust the color temperature, the device has at least one adjustment control element for at least one remote control transmitter for adjusting the color temperature of a light source. A photographer can set or adjust the color temperature in a remotely controlled manner via the adjustment element and the remote control transmitter.

4 Claims, 2 Drawing Sheets

DEVICE FOR MEASURING COLOR TEMPERATURE

BACKGROUND OF THE INVENTION

The present invention relates to a device for measuring color temperature, and has at least one measuring diffuser and at least one indicator for the color temperature, as well as operating elements for turning the device on and off, for resetting the measured value, and for initiating a measurement.

Conventional color temperature measuring devices have an indicator for the color temperature and for the filter values that might be necessary. In addition, these devices are provided with the necessary operating elements, such as switches, reset buttons, buttons for initiating measurement, buttons for inputting the desired film, etc. During a measurement process, the photographer holds the measuring device in the beam of light in front of the object that is to be photographed and releases a flash from the flash unit. If the measuring device indicates that a filtering or change of the color temperature is necessary, the photographer must appropriately filter the light source and undertake appropriate adjustments to alter the color temperature at the flash unit or at the lamp or generator. Subsequently, the measurement must be repeated in order to confirm the setting. Due to the numerous manipulations that are necessary, this manner of operation is time consuming and takes a lot of effort.

It is therefore an object of the present invention to embody a color temperature measuring device of the aforementioned general type in such a way that the color temperature can be easily and rapidly set or adjusted without the need for numerous manipulations in order to accomplish this.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The device of the present invention is characterized primarily by at least one remote control transmitter for adjusting the color temperature of a light source, and by at least one adjustment control element for the remote control transmitter.

With the inventive device for measuring color temperature, the photographer does not have to leave the measuring position anymore in order to adjust the color temperature. Rather, by means of the adjustment element and the remote control transmitter, the photographer can set or adjust the color temperature in a remotely controlled manner. If the test measurement indicates that the color temperature value is not adequate, it is merely necessary for the photographer to actuate the adjustment element on the measuring device, as a result of which the remote control transmitter emits appropriate signals to the flash unit or lamp or generator so that the appropriate adjustments or changes of the color temperature are undertaken by the same.

Further specific features of the present invention will be described in detail subsequently.

DESCRIPTION OF PREFERRED EMBODIMENTS

Figure 1:
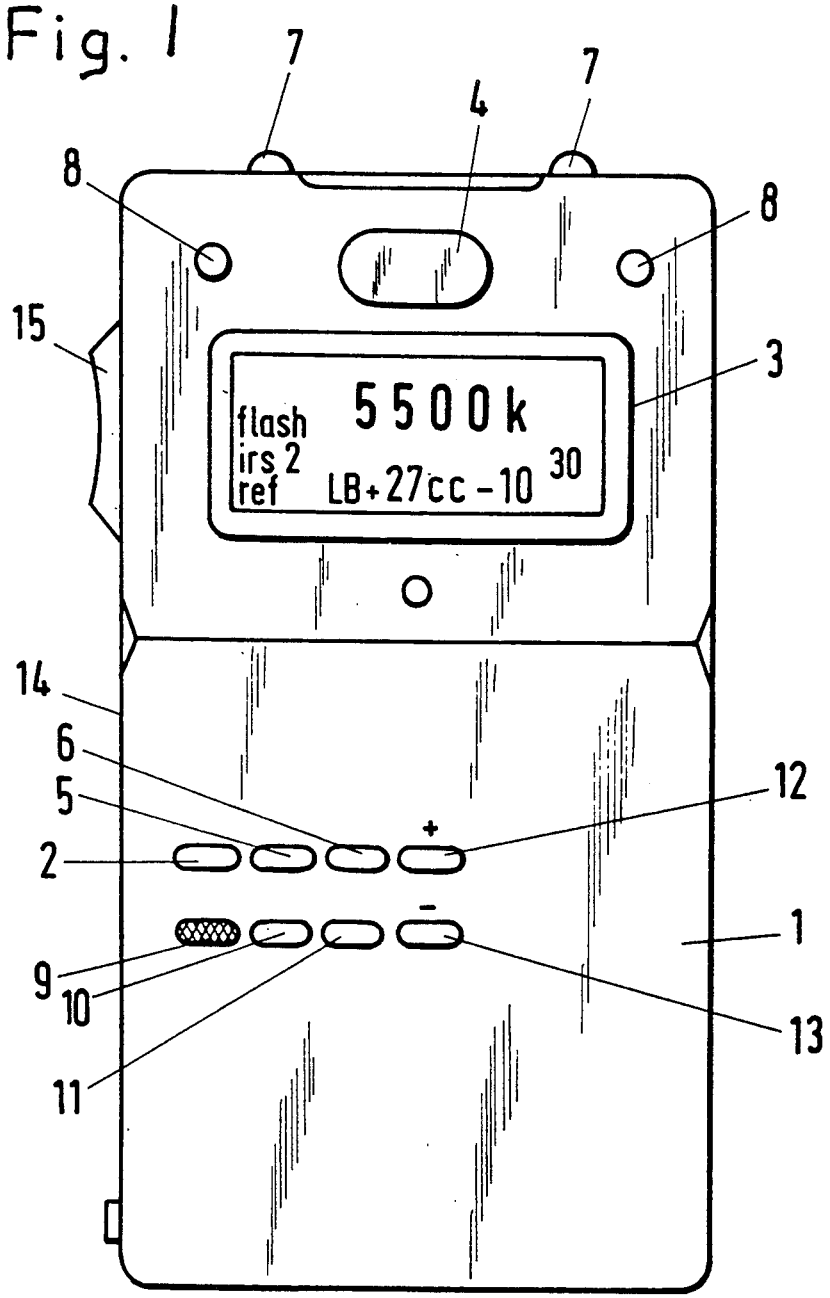
FIG. 1 is a front view of one exemplary embodiment of the inventive color temperature measuring device for flash units.

Referring now to the drawings in detail, the device for measuring color temperature illustrated in FIG. 1 is provided with a housing 1 in which is accommodated the circuitry. The housing 1 has a rectangular configuration, and is provided in one portion thereof with an indicator window 3 in which are displayed the color temperature value, filter values, and other lighting values that are important to the photographer. Provided in the region above the indicator window 3 is a measuring diffuser 4 that during the measuring procedure is disposed in the beam of light and that is connected to the circuitry within the housing 1. Such a measuring diffuser 4 for devices for measuring color temperature is known. The circuitry processes the signals obtained from the measuring diffuser and then indicates them in the indicator window 3.

In the embodiment illustrated in the drawing, the measuring diffuser 4 and the indicator window 3 are disposed in the upper portion of the front side of the housing 1, while the control or operating elements are disposed in the lower portion thereof. This assures that the operating elements can be manipulated without the indicator window 3 being covered by the hand of the operator. Thus, the measured values indicated in the window 3 can also be satisfactorily read during the setting or adjustment process.

The operating elements are disposed in two rows that are placed one above the other, so that they can be easily actuated. A flash unit or lamp can be triggered with the push button 2. In the same row next to the button 2 is the push button 5 with which the filter values at the lamp or flash unit can be set. Disposed next to the button 5 is the push button 6 with which the remote control transmitters 7 and 8 can be actuated. To actuate the remote control transmitter 7, the push button 6 must, for example, be pressed once, and to actuate the remote control transmitter 8 the push button 6 must, for example, be pushed twice.

Disposed below the button 2 is the push button 9 for turning the inventive color temperature measuring device on and off. This button preferably has a profiling or knurling on its surface so that this push button can easily be distinguished from the other buttons. This is important, for example, if one is working in a dark room where visibility is poor. The photographer can then easily feel the on/off button 9 via the profiling or knurling and can actuate the same. Disposed next to the button 9 are two push buttons 10 and 11 via each of which predetermined measured value combinations can be stored. The push buttons 2, 5, and 6 are disposed next to one another in one row and are disposed over the row of push buttons 9 to 11. In addition to these operating buttons, the inventive device for measuring color temperature is provided with two setting or adjustment buttons 12 and 13, with the adjustment button 12 being disposed next to the push button 6, and the adjustment button 13 being disposed next to the push button 11. By means of the adjustment buttons 12 and 13, the various measured values indicated in the window 3 can be adjusted.

In the embodiment illustrated in the drawing, the two rows of push buttons are offset toward the left long side 14 of the housing 1. It has been shown that such an arrangement of the push buttons considerably simplifies operation of the color temperature measuring device. Disposed on the long side 14 at the level of the indicator window 3 is a rocker-type button 15 for setting the measured values to zero (reset function) and also for being able to start the measurement.

In order to be able to measure the color temperature of the light emitted by a flash unit or a lamp, the measuring device is held in the beam of light in front of the object that is to be photographed in such a way that the measuring diffuser 4 reads the beam of light. Before the measurement is carried out, the push button 9 is pressed to turn the measuring device on. Subsequently, the measured values indicated in the window 3 are reset to zero by the rocker-type button 15. The measuring device is now ready to measure the color temperature.

The measuring device is now held in the beam of light emitted by the lamp or flash unit in such a way that the beam of light strikes the measuring diffuser 4. In so doing, at the same time, or slightly prior to holding the measuring diffuser 4 in the beam of light, a readiness for measurement is set via the rocker-type button 15. The measured color temperature is then indicated in the window 3. In addition, further measurement values, such as the filter values, which are set with the push button 5, can also be indicated in the window 3. This indication, as well as the circuitry for effecting the same, are known for color temperature measuring devices.

When the measured and indicated color temperature value does not correspond to the required value, it is possible with this measuring device to alter, in a remotely controlled manner, the color temperature of the light emitted by the flash unit or the lamp. The two remote control transmitters 7, which are preferably infrared diodes, are provided for this purpose. As to the two remote control transmitters 7, each one thereof is operatively connected with a respective one of the adjustment control elements 12, 13. Since the measuring device preferably has two pairs of the remote control transmitters 7 and 8, the desired transmitter must be selected with the push button 6. Subsequently, the remote control transmitter 7 can be set to transmit by pressing the push button 2. By means of the two adjustment buttons 12 and 13 the color temperature value at the flash unit or lamp can then be adjusted in a remotely controlled manner. The color temperature value can be increased with the adjustment button 12 and one of the remote control transmitters 7, and the color temperature value can be lowered using the adjustment button 13 and the other remote control transmitter 7. After the color temperature value has been adjusted, a test measurement can again be undertaken in the manner described above and in a remotely controlled manner, and the color temperature of the light emitted by the flash unit or lamp can be measured. If a further correction is necessary, this can be easily undertaken with the aid of the adjustment buttons 12 and 13. As can be clearly seen, the photographer need not leave his measuring position, so that the color temperature can be set very easily and in a time-saving manner. The photographer also has the assurance that he can always hold his measuring device in approximately the same position in the beam of light, so that satisfactory measuring results are achieved.

The filter values could also be set in a remotely controlled manner with the inventive measuring device. For this purpose, it is merely necessary to first press the push button 5 and to then adjust, in a remotely controlled manner, the desired filter value using the adjustment buttons 12 and 13. The remote control transmitters 7 are again utilized for this remote control.

A particular advantage of the inventive measuring device is that the lamp or flash unit could also be triggered in a remotely controlled manner. For this purpose, the remote control transmitters 8, in conjunction with the push button 2, are utilized. Thus, the photographer does not have to leave the measuring position either for the measuring process or for setting the appropriate parameters. The filter values are also indicated in the window 3, so that the photographer can easily adjust the desired filter value.

In order to adjust the color temperature, the flash energy can be varied by altering the voltage applied to the flash tube (so-called amplitude control). The flash unit has at least one, and preferably several, power sources that are charged to different levels depending upon the energy that is required. The greater the charge on the power source, the greater is the quantity of light that can be emitted. Thus, by varying the charge voltage, the quantity of light can be adjusted very accurately. As a consequence of the various charge voltages, the color temperature of the flash changes. As the charge voltage drops, lower color temperatures result, whereas with higher charge voltages, higher color temperatures are obtained. In addition, the color temperature can be varied by the duration of the flash. Where the flash duration is shorter, i.e. where the turn-off time comes sooner, the color temperature of the flash is shifted toward higher values, whereas where the flash duration is longer, the color temperature has lower values. This so-called time control can also be superimposed over the amplitude control, so that the color temperature can be precisely set to the respectively desired value. For example, if the amount of light that is to be emitted is to be reduced, the charge voltage is reduced, and at the same time the duration of the flash is shortened. Since by reducing the charge voltage a shift toward lower color temperatures is effected, and by shortening the flash duration a shift toward higher color temperatures is effected, the desired color temperature can be produced by a suitable selection of the reduction of the charge voltage and the shortening of the flash duration. The color temperature can be kept constant, for example over a large setting range, so that the color temperature is always the same, regardless of the amount of light that is emitted. It is also possible, by an appropriate selection of the charge voltage and the flash duration, to intentionally shift the color temperature to lower or higher values. By means of the aforementioned combination of amplitude and time controls, an automatic adjustment or setting is possible.

Figure 2:
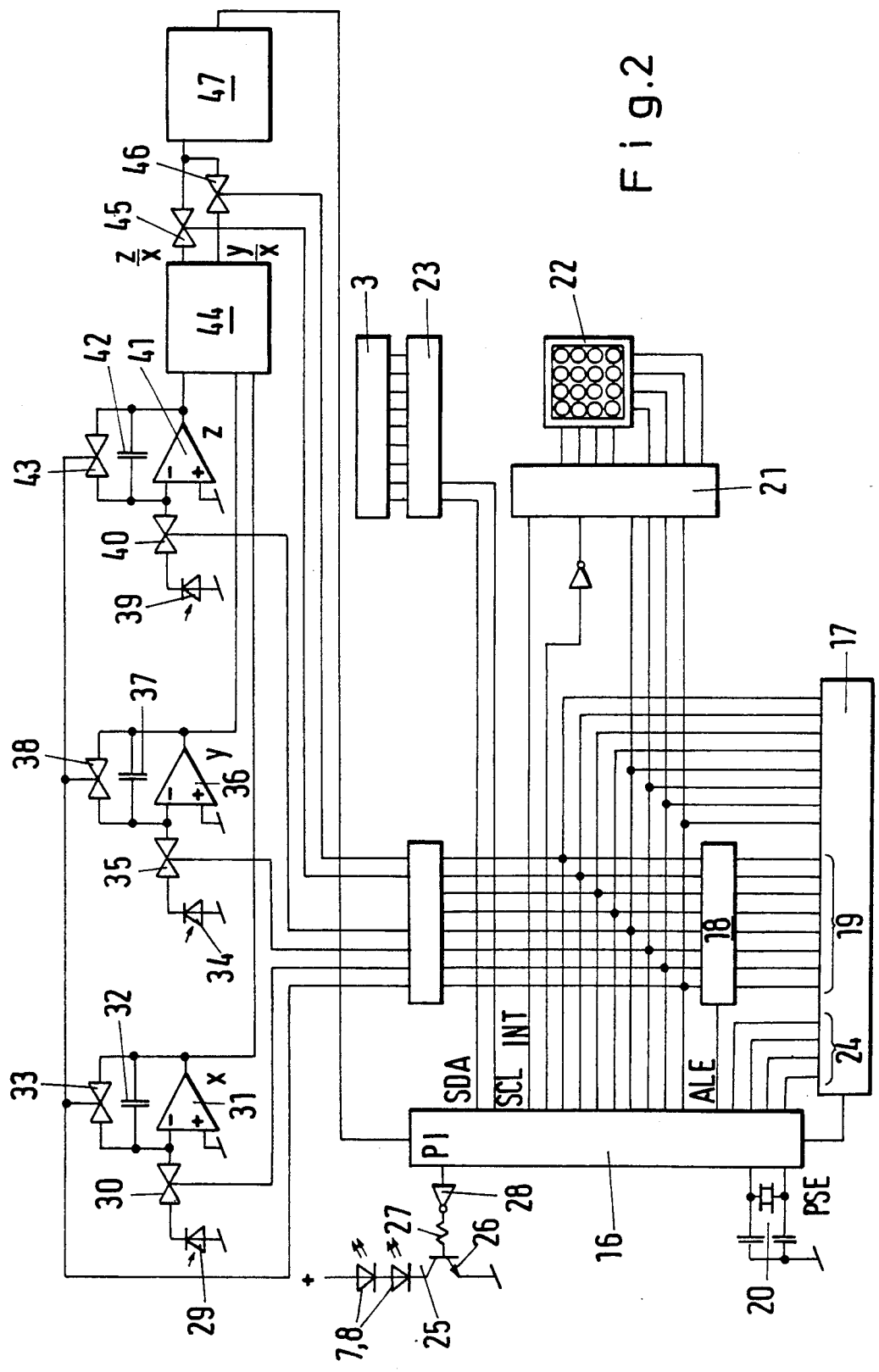
FIG. 2 shows one exemplary embodiment of the circuitry for the inventive color temperature measuring device.

The exemplary circuit illustrated in FIG. 2 comprises a microprocessor 16 having an external program storage means 17. An address memory 18 is connected to the microprocessor 16 via the data bus 19. The circuitry is furthermore provided with an oscillator 20, which is connected to the microprocessor 16, a keyboard coder 21, and a keyboard 22 of the measuring device. The display 3 is connected via an indicator driver 23 to the connections SDA (series data) and SCL (serial clock). In addition to being connected to the data bus 19, the address memory 18 is also connected to the connection ALE (address latch enable) of the microprocessor 16. The program storage means 17 is connected to the microprocessor 16 via the address bus 24. In addition, the program storage means 17 is connected to the connection PSE (program store enable) of the microprocessor 16.

The infrared transmitting diodes 7 and 8 are disposed in an infrared transmission stage 25 that is connected to the connection PI of the microprocessor 16 via the transistor 26, a resistor 27, and a negation element 28.

The intensity of the red light radiation is measured via an appropriately filtered phototriode 29, the photoelectric current of which is proportional to the intensity, and which is connected via an analog switch 30 to the input of the operation amplifier 31, which is connected as an integrator. In a state of rest, an integration capacitor 32 is short circuited by the analog switch 33 and the photocell 29 is electrically separated from the integration circuit by the opened analog switch 30. If a measurement is to be carried out, the microprocessor 16, for the desired integration time, sets the analog switch 30 in the conducting state and the analog switch 33 in the closed state. As a result, the photoelectric current of the diode 29 that is proportional to the incident amount of red light is integrated in the capacitor 32 and is available at the conclusion of the measuring interval as voltage at the output of the operation amplifier 31. At this point in time, the voltage at the output of the color-measuring channel "x" corresponds to the amount of red light measured in this time interval.

The blue light channel "y", with the components 34 to 38, as well as the green light channel "z", with the components 39 to 43, function in the same manner. To calculate the color temperature, the relationship of blue light and red light is controlling, as is known. In the present example, this relationship is produced by forming in a divider stage 44 the ratios z:x (i.e. green divided by red) and y:z (i.e. blue divided by red). These ratio values are available as voltage values at the output of the divider circuit, and are chronologically connected to an analog/digital conversion stage 47 via analog switches 45 and 46 that are controlled by the microprocessor 16. The code resulting at the output of the AD stage 47 is read-in by the microprocessor. The microprocessor 16 then reads the resulting color temperature from a two-dimensional table as a function of the ratios z:x and y:x. If the measured value does not coincide with the desired value, the user, in the manner described in conjunction with FIG. 1, can, via the keyboard by pressing a key provided therefor, have the microprocessor 16 send out via the infrared transmission stage 25 a code signal that the light source (for example the flash unit) can receive and can utilize to correct the electrical parameters by shifting the color temperature in the desired direction.

The present invention is, of course, in no way restricted to the specific disclosure of the specification and drawings, but also encompasses any modifications within the scope of the appended claims.

What I claim is:

1. In a device for measuring color temperature, having at least one measuring diffuser and at least one indicator for said color temperature, as well as operating elements for turning said device on and off, for resetting measured values, and for initiating a measurement, the improvement comprising:

two remote control transmitters for adjusting the color temperature of a light source, said remote control transmitters being installed within the device for measuring color temperature itself;

one respective adjustment control element for each one of said remote control transmitters also within the device for measuring color temperature, so that measuring and adjusting of color temperature is undertaken in the same device, with said two adjustment control elements respectively adjusting said color temperature to higher or lower values; and said two remote control transmitters being operatively connected with a respective one of said adjustment control elements.

2. In a device for measuring color temperature, having at least one measuring diffuser and at least one indicator for said color temperature, as well as operating elements for turning said device on and off, for resetting measured values, and for initiating a measurement, the improvement comprising:

at least one remote control transmitter for adjusting the color temperature of a light source, said remote control transmitter being installed within the device for measuring color temperature itself;

at least one adjustment control element for said at least one remote control transmitter also within the device for measuring color temperature, so that measuring and adjusting of color temperature is undertaken in the same device; and at least one adjustment control element provided for remote control adjustment of filter values at a flash unit.

3. A device according to claim 2, which includes at least one operating element for said filter values such that actuation thereof, as well as of said at least one adjustment control element, activates said at least one remote control transmitter to emit signal means for filter value adjustment.

4. In a device for measuring color temperature, having at least one measuring diffuser and at least one indicator for said color temperature, as well as operating elements for turning said device on and off, for resetting measured values, and for initiating a measurement, the improvement comprising:

at least one remote control transmitter for adjusting the color temperature of a light source, said remote control transmitter being installed within the device for measuring color temperature itself;

at least one adjustment control element for said at least one remote control transmitter also within the device for measuring color temperature, so that measuring and adjusting of color temperature is undertaken in the same device;

at least one further remote control transmitter for release of a flash in a remotely controlled manner; and said first mentioned remote control transmitter and said further remote control transmitter are disposed on different sides of a housing of said device.

* * * * *